United States Patent [19]

Cheng et al.

[11] Patent Number: 4,895,994

[45] Date of Patent: Jan. 23, 1990

[54] SHAPED CATALYSTS AND PROCESSES

[75] Inventors: Wu-Cheng Cheng, Columbia; Christian B. Lundsager, Ashton; Robert M. Spotnitz, Baltimore, all of Md.

[73] Assignee: W. R. Grace & Co.-Conn., New York, N.Y.

[21] Appl. No.: 245,494

[22] Filed: Oct. 18, 1988

Related U.S. Application Data

[62] Division of Ser. No. 181,357, Apr. 14, 1988, Pat. No. 4,826,799.

[51] Int. Cl.$^4$ .............................................. C07C 5/02
[52] U.S. Cl. .................................... 585/270; 208/217; 208/253; 208/254 H; 208/262.1; 518/715; 564/422; 564/490; 564/494; 585/176; 585/277; 585/469; 585/629
[58] Field of Search ............... 585/270, 276, 277, 629; 518/715; 564/422, 490, 494; 208/217, 253, 254 H, 262, 469

[56] References Cited

U.S. PATENT DOCUMENTS

| | | | |
|---|---|---|---|
| 3,972,940 | 2/1976 | Morgan | 564/490 |
| 4,089,812 | 5/1978 | O'Hare et al. | 518/715 |
| 4,422,961 | 12/1983 | Gray | 518/715 |
| 4,513,149 | 4/1985 | Gray et al. | 585/270 |
| 4,792,626 | 12/1988 | Beeher et al. | 564/422 |
| 4,826,799 | 5/1989 | Cheng et al. | 502/301 |

*Primary Examiner*—Asok Pal
*Attorney, Agent, or Firm*—Edward J. Cabic

[57] ABSTRACT

Catalysts made by the Raney process (e.g., Raney process nickel) pelletized in matrix of polymer and plasticizer are activated by either (a) removal of plasticizer (e.g., by solvent extraction) followed by leaching out Al with caustic solution, leaving an active catalyst made by the Raney process in a polymer matrix; or (b) removal of plasticizer, then calcining to remove polymer, followed by leaching with caustic. The activated catalyst pellets have sufficient strength and attrition resistance for efficient use in fixed beds and packed columns for superior hydrogenation of toluene, heptene, butyraldehyde, and other conventional feedstocks used with catalysts made by the Raney process.

8 Claims, No Drawings

SHAPED CATALYSTS AND PROCESSES

This is a division of application Ser. No. 181,357, filed April 14, 1988, now U.S. Pat. No. 4,826,799.

RELATED CASE

U.S. patent application having Ser. No. 054,470, filed May 26, 1987, Lundsager, "Ceramic Product and Process", discloses and claims mixtures of polymer, plasticizer and finely divided Al; with shaping, removal of plasticizer, and calcining the shape. Alloys as used in the Raney process are not disclosed.

FIELD OF THE INVENTION

This invention relates to the catalysis art, and more particularly to an improvement in porous catalysts made by the Raney process and their use in catalysis.

DEFINITIONS

"Raney process" refers to a process for making a porous, active metal catalyst by first forming at least a binary alloy of metals where at least one of the metals can be extracted and then extracting that metal whereby a porous residue is obtained of the nonsoluble metal which has activity as a catalyst. See, for example, "Catalysts from Alloys—Nickel Catalysts" by M. Raney, Industrial and Engineering Chemistry, vol. 32, pg. 1199, Sept. 1940, and U.S. Pat. Nos. 1,628,190; 1,915,473; 2,139,602; 2,461,396 and 2,977,327 to M. Raney. It includes the present improved process. Commercial catalysts already made by this process are made by W. R. Grace & Co. and sold under the trademark RANEY(R) catalyst.

"Raney process metal" refers to any of a certain group of the nonsoluble metals well known in the Raney process art which remain as the porous residue and which typically are Ni, Co, Cu, and Fe.

"Raney process alloy" refers to alloys of aluminum, zinc, or silicon with a Raney process metal.

"Catalyst made by the Raney process" refers to the composition resulting from leaching aluminum (or Zn or Si) from a Raney alloy.

"Raney process particle" means particles of either Raney process alloy or catalyst made by the Raney process (depending on context) having a size in the range of about minus 50 mesh or less, e.g., minus 200 mesh.

Mesh sizes refer to U.S. Standard screens.

"Catalysis using catalysts made by the Raney process" means use of a catalyst made by the Raney process (including the catalysts of this invention) in converting a reagent feedstock to another product, generally by a mechanism involving hydrogenation, dehydrogenation, animation, or the like.

A comment re mesh sizes: following convention, "−200 mesh" means that all the material (here a powder) passes a 200-mesh screen. "6–8 mesh", "6×8", "−6+8" means that substantially all the material (here, granules) passes a 6-mesh screen but substantially all is retained on an 8-mesh screen. Smaller than 50 mesh'- 'means substantially all the material passes a 50-mesh screen.

"BET" (Brunauer, Emmett, and Teller) refers to a method of surface area determination described in "Chemical and Catalytic Reaction Engineering" by J. J. Carberry, pp. 369–373, McGraw-Hill Book Co. (1976). Our BET surface area measurements were made on the Quantachrome Monosorb (Syosset, NY). Molecular weights are weight average.

"High molecular weight" means at least 100,000.

SUMMARY OF THE INVENTION

The invention proceeds in steps:

(1) Particles of Raney alloy are mixed with high molecular weight polymer and preferably, but not necessarily plasticizer for the polymer, typically mineral oil. Other ingredients, e.g., inert fillers, stabilizers, etc., are optional.

(2) The mixture is formed into shapes, typically by extrusion and cutting.

(3) Plasticizer, if present, is removed wholly or partly from the shape by extraction or vaporizing.

At this point the invention branches into two basic systems, A and B:

In System A:

(4-A) The shape resulting from (3) is treated with sodium hydroxide to remove aluminum metal by the conventional Raney technique. This Step (4-A) results in a very active catalyst made by the Raney process, useful in both batch and fixed bed processes at temperatures below the softening point of the polymer matrix. We call this our "polymer-bound catalyst".

In System B:

(4-B) The shape resulting from (3) is calcined.

(5-B) The calcined shape is leached with sodium hydroxide solution to remove aluminum. The result is a very active shaped catalyst made by the Raney process useful in both batch and fixed bed processes at all conventional Raney catalysis temperatures used with catalysts made by the Raney process. We call this our "calcined catalyst".

Each of the above steps results in a novel composition. The products of Steps (4-A) and (5-B) are of particular value in that they provide durable shaped catalysts made by the Raney process that can be used in fixed bed processes more efficiently than any catalyst made by the Raney process heretofore known. Besides this they are in many instances nearly twice as active as most commercial catalysts made by the Raney process in conventional fixed bed hydrogenations.

For the sake of clarity, the above numbering system may be used herein from time to time.

Our processes may be recapitulated as follows:

(1) Mix together Raney process alloy powder, polymer, and (preferably) plasticizer, suitably with heating.

(2) Shape (e.g., by thermoplastic extrusion, molding, etc.).

(3) remove some or all of plasticizer, if present, (by extraction or vaporizing).

| A | B |
|---|---|
| (4-A) Leach Al; gives polymer-bound catalyst | (4-B) Calcine. (5-B) Leach Al; gives calcined catalyst, bound by alumina. |

BACKGROUND OF THE INVENTION

Catalysts made by the Raney process have been known for many years and have found wide application in the hydrogenation of unsaturated organic compounds such as olefins, acetylenes, aromatic compounds, nitriles, nitrocompounds, aldehydes, ketones, and the like.

The active catalysts are conventionally produced from an alloy of a catalytic metal, such as nickel, with aluminum. The alloy is ground to a fine powder, and the aluminum is removed by leaching with caustic soda solution, leaving finely divided nickel with a surface area of about 10–100 square meters/gram. In this form the nickel, cobalt or other Raney process metal has a great capacity for adsorbing hydrogen, which characteristic gives these catalysts their value.

Catalysts made by the Raney process are generally used in slurry form. The nature of the particles makes packed-column use difficult. In recent years, however, larger granules (e.g., 3–6 mesh, 6–8 mesh, etc.) have become available, permitting limited packed-column use. Such materials are surface-activated and require periodic reactivation resulting in fines.

REFERENCES INVOLVING POLYMER-FILLER MIXES

U.S. Pat. No. 3,351,495 discloses preparation of a battery separator starting with a uniform mix of polyolefin, filler, and plasticizer. The filler can be carbon black, coal dust, graphite; metal oxides and hydroxides such as those of Si, Al, Ca, Mg, Ba, Ti, Fe, Zn, and Sn; metal carbonates such as those of Ca and Mg; minerals such as mica, montmorillonite, kaolinite, attapulgite, asbestos, talc, diatomaceous earth and vermiculite; and a number of other salts and compounds. The mix contains no metal and is not fired.

U.S. Pat. No. 3,904,551 discloses a process for making a porous ceramic monolith such as an auto exhaust catalytic converter. A three-component mix is used which comprises a ceramic component, a polymer, and a plasticizer. The ceramic component is a sinterable material such as alumina, spodumene, mullite, zircon, mullite, magnesia-alumina, spinel, cordierite, and aluminum titanate. Cordierite is a preferred material, and it has the formula $2MgO \cdot 2Al_2O_3 \cdot 5SiO_2$. A plasticizer, such as mineral oil, is extracted with hexane prior to sintering, whereby a microporous structure is obtained. No metal is used in the mix.

U.S. Pat. No. 3,953,562 discloses stabilizing ceramic green sheets against dimensional changes by contacting the sheet with a solvent which softens the binder (which can be a thermoplastic polymer) in the ceramic green sheet and thereby permits relief of stress. The ceramic mix as such contains no metal, nor is the final product porous.

U.S. Pat. No. 4,364,877 teaches making a homogeneous mix of alumina plus a small amount of another oxide, with an organic binder, followed by firing in two steps, the first to remove the binder and the second to sinter the particles to make the frit. No metal is involved, and the product is dense and impervious, not porous.

Australian Patent No. 277,981 discloses a three-component mix of polyolefin, ceramic filler, and plasticizer. The plasticizer can be extracted. No metals are disclosed, nor is the mix fired or otherwise heated.

British Patent No. 1,044,502 discloses mixes of polyolefin, ceramic filler, metal (Al or Pb), and plasticizer to make film or filament. The plasticizer can be extracted with a solvent such as petroleum ether to give a porous product. Heating or firing is not taught. A Raney process alloy is not involved.

British Patent No. 1,458,961 discloses a three-component mix of olefin polymer, finely divided sinterable metal, and plasticizer. The plasticizer which is typically a hydrocarbon oil is extracted with a solvent such as hexane, then the structure is heated to remove most or all of the olefin polymer, and finally the structure is fired to sinter the metal particles. No ceramic materials are disclosed, nor is a Raney process alloy involved.

DETAILED DESCRIPTION OF THE INVENTION (1) Mixture of Raney Process Alloy, and Polymer (and, optionally, Plasticizer)

The Raney process alloy can be any conventional Raney process alloy. These materials are well known and are available commercially as alloys consisting of 45–75 weight % Al and 25–55% of a conventional Raney process metal, e.g., Ni, Co, Cu, or Fe, or mixture of these. These alloys are available in particle sizes below 50 mesh, and all are useful in our invention. They may be promoted by, e.g., Cr, Mo, Pt, Ir, Rh, Ru, Os, and Pd, typically at about 2 weight % of total metal.

The Binder System

The binder system comprises materials capable of being volatilized away when the composition is heated in the presence of air or oxygen. The binder can be just a polymer alone or (preferably) a combination of polymer and a plasticizer for the polymer.

The Polymer Component

Polymers suitable for purposes of this invention include materials which are fluid at some stage in their processing. Suitable thermoplastics for carrying out this invention include: unplasticized polyvinyl chloride, polyvinyl chloride-propylene copolymer, polyvinyl chloride-ethylene copolymers, polyvinylidene chloride copolymers, polystyrene, impact styrene, ABS resin, styrene butadiene block copolymers, polyethylene low (0.91 sp. gr.) to high density (0.97 sp. gr.), polyethylene copolymers with propylene, butene, 1-pentane, 1-octane, hexene, styrene, etc., polyethylene copolymers with vinyl acetate, alkyl, acrylate, sodium acrylate, acrylic acid, etc., chlorinated polyethylene, chlorosulfonated polyethylene, polypropylene and propylene-olefin copolymers, polybutene and butylene-olefin copolymers, poly-4-methyl-1-pentene, thermoplastic polyurethanes, polyamides, e.g., Nylon-5, Nylon-12, Nylon-6/6, Nylon-6/10, Nylon-11 fluorocarbon resins such as FEP, polyvinylidene fluoride, polychlorotrifluoroethylene; acrylonitrile-methyl acrylate copolymers, acrylonitrile-vinyl chloride copolymers, methacrylonitrile-styrene copolymers, polymethyl methacrylate, cellulose acetate, cellulose acetate butyrate, acetal, polycarbonate, polysulfone, polyphenylene oxide, polyethylene and butylene terephthalates.

Many thermosetting resins and crosslinkable resins are also suitable for purposes of this invention and include the following: radiation cured polyethylene, peroxide-cured polyethylene, diazo crosslinked polypropylene, epoxy resins; hydrocarbon, chloroprene, and nitrile rubbers, furane, melamine-formaldehyde, urea-formaldehyde, phenol-formaldehyde, diallyl phthalate, polyesters and silicones.

From economic considerations, one wishes to use relatively inexpensive binder polymer since in one catalyst formulation, 5-B, they will be burned away in the final product. A preferred group of polymers are polyolefins, polyvinyl chlorides, polyvinyl acetates, polystyrenes and mixture of these polymers. The polyolefins are most preferred, and these are discussed separately below.

The Polyolefin Component

The preferred polyolefin component is the same as that used in mixes of the prior art, e.g., as described in U.S. Pat. Nos. 3,351,495 and 3,904,551. Thus, the polyolefin (which may be a mixture) has a high molecular weight (at least 100,000). Suitably it is a linear polyethylene of at least 0.93 to 0.97 g/cm$^3$ density; high molecular weight polypropylene; or high molecular weight particle form ethylene-butylene copolymer. Others are polybutene, ethylene-propylene copolymers, ethylene-butene copolymers, propylene-butene copolymers, and ethylene-propylene-butene copolymers. A useful polyolefin is a commercial particle form high molecular weight polyethylene having a standard load (2,160 g) melt index of 0.0; a high load (21,600 g) melt index of 1.8, a density of 9.96, and a solution viscosity of 4.0 measured as 0.02 g of polymer in 100 g decalin at 130° C.

Blends of high and low molecular weight polyolefins can be used, bearing in mind that as the average molecular weight is reduced, the possibility of slumping is increased during the bake-out and early part of the firing process.

If not otherwise identified, the polyolefin component used in our examples is an ultra-high molecular weight linear polyethylene available as "GUR-412" from American Hoechst Corp.; its molecular weight is 1–2 million. An excellent alternate having a lower molecular weight of about 200,000, is FD 60-018 polyethylene, available commercially from Allied Chemical Corp.

The Plasticizer Component

The plasticizer component can be that used in prior art mixes, e.g., as described in U.S. Pat. Nos. 3,904,551 and 3,351,495, bearing in mind that some plasticizers will react violently with finely divided Al, e.g., the lower alcohols, and that these should, of course, be avoided. A particularly useful plasticizer is mineral oil. Hydrocarbons, e.g., paraffin oil and low polymers such as polyisobutylene and polybutadiene, are suitable. The more volatile types of mineral oil are preferred if removal is to be done by baking.

The plasticizer makes possible melt processing of the composition, i.e., it lowers the melt viscosity and reduces the amount of power input which is required to compound and fabricate the composition. Very importantly, the plasticizer, by its removal, imparts porosity to the composition and increased its viscosity so that slumping during the initial part of the firing is eliminated, thereby providing greenware suitable for firing, in that it retains its shape and combustion products from the polyolefin or other polymer and residual amounts of plasticizer can escape through the pores.

When plasticizer is used, it comprises about 10–40 wt. %, preferably 15–30 wt. %, of the total mixture. This is equivalent to about 0.1–0.35 cc/g, or about 30–70 volume %, preferably about 35–55 volume %.

If not otherwise identified herein, the preferred plasticizer used in the examples herein is a mineral oil, e.g., Sunthene-255 or Gulf mineral oil.

Fillers

Removable, finely-divided fillers can be added to enhance porosity or for other purposes. For example, we have added Al powder, which is substantially removed during the leaching step with NaOH. Other powdered fillers that can be removed in the NaOH or other aqueous solution include sugar, various salts, such as sodium carbonate, powdered urea, and the like. Some fillers can be added with a view to increasing bulk and/or strength in the final catalyst shape; i.e., they remain in the shape as used. Such fillers include $TiO_2$, alpha-alumina, mullite, cordierite, etc. All are, of course, finely-divided. The $TiO_2$ may be expected to react with alumina to form aluminum titanate during the sintering process.

Miscellaneous Additives

It is conventional to add stabilizers (antioxidants) and lubricants when fabricating polyolefin-containing materials. Such additives and the amounts and manner of their use are well known in the art. Representative of the stabilizers are 4,4 thiobis (6-tert-butyl-m-cresol) ("Santonox") and 2,6-di-tert-butyl-4-methylphenol ("Ionol"). Stabilizers are burnt off during firing. Zinc stearate is a preferred lubricant, and may be used in up to a 0.5% concentration as an aid to give good dispersion of the solids in the polymer-plasticizer solution during compounding. Other commonly known extrusion aids, stabilizers, and coupling agents can advantageously be incorporated in said formulations.

In its simplest aspect the invention involves mixing together only polymer and Raney alloy, omitting plasticizer, filler, etc. The mixture can be shaped and at least a portion of the Al leached from the shape with NaOH solution to provide a shaped polymer-bound Raney catalyst. In another embodiment using only polymer and Raney alloy, following shaping, the shaped mixture is calcined to remove polymer and to sinter the Raney alloy particles, then Al is leached out to form the final calcined catalyst.

The Compounding Operation

In addition to the Haake Rheometer used in the examples, mixing is also suitably carried out in conventional mixers such as a Banbury or Brabender mixer. When continuous compounding is desirable, the used of intermeshing twin screw compounders is desirable. An example is the MP compounder manufactured by Baker Perkins Co. and the ZSK compounder manufactured by Werner and Pfleiderer. Acceptable compounds may also be made by multiple passes through conventional single screw thermoplastics extruders.

In the specific case of polyethylene/oil plasticizer, on cooling the mix, the oil separates as a finely-dispersed liquid phase, readily removed as herein described.

The mixture of Step (1) above thus comprises (a) particles of Raney process alloy, minus 50-mesh or finer, preferably about minus 100 mesh; about 60–90 parts by weight, preferably about 70–85 parts;

(b) high molecular weight polymer, about 1–30 parts by weight, preferably about 2–20 parts; and (c) plasticizer, 0–40 parts by weight, preferably about 10–30 parts by weight, equivalent to about 0–70 volume % of the total mixture, preferably about 35–55 volume %.

This mixture is believed novel.

(2) Shaping the Mixture

The mixture resulting from Step 1 is now formed into shapes, having regard to the geometrical form desired in the finished catalyst. Extrusion is one of the simplest methods of shaping. For example, the mixture can be extruded in conventional extruders as solid rods, tubes (hollow or vaned), and filaments, all chopped into segments of the desired length in the known way. Some of the simplest and most effective shapes are pellets made by cutting 1/32, 1/16, ⅛, and ¼ inch diameter rods into one half to six times the rod diameter. Hollow cylinders and radial-vaned catalyst pellets may be made by various extrusion processes. See, e.g., U.S. Pat. No. 3,907,710 (Lundsager) and U.S. Pat. No. 4,510,263

(Pereira et al) which discloses extrudes with a cylindrical, hollow annular configuration with internal reinforcing vanes. Other thermoplastics forming processes such as compression and injection molding may also be used. The general idea is that the mixture is shaped into final form prior to use (in the case of our polymer-bound catalyst) or prior to firing (in the case of our calcined catalyst). It is preferred to have the mixture heated during shaping since it is easier to shape the polymer containing mass when it is heated.

At this point the material of the shape is still identical in composition to the mixture of (1). It is ready for the next step, removal of some or all of the plasticizer (e.g., mineral oil).

(3) Plasticizer (Oil) Removal

Plasticizer can be removed from the shape made in Step (2) by various methods. The two best are extraction with a solvent (e.g., hexane), or, if the plasticizer is sufficiently volatile (as are certain mineral oils), by heating the shape in an air circulating oven at about 100° C. for a few hours, whereby the oil is vaporized and removed; in essence the shape is dried. Removal of plasticizer leaves a shaped composition consisting essentially of particles of Raney process alloy in a polymer matrix. That is to say, at this point the composition consists essentially of an intimate mixture of:

(a) particles of Raney process alloy, passing 50 mesh, preferably passing 100 mesh, about 60-90 parts by weight, preferably about 70-85 parts;

(b) high molecular weight polymer, about 1-30 parts by weight, preferably about 2-20 parts; and (c) homogeneous voids, left by removal of plasticizer, if any, about 0.1-70 volume % of the mixture, preferably about 35-55 volume %.

As noted, in some formulations the plasticizer may be omitted, in which case there will of course be no plasticizer-generated voids. When a plasticizer is used, the voids occupy the same volume (or a little less) that the plasticizer occupied.

Here, as above noted, the invention branches. The next step can be either (4-A), leaching Al with caustic soda solution, or it can be (4-B), calcination.

(4-A) Leaching Al

We describe (4-A), leaching out Al with strong caustic soda solution (typically about 6N). Leaching is done hot, about 90° C., but preferably not over 100° C. Leaching with NaOH is exothermic, and cold water may be added periodically to maintain the temperature at 90°. Leaching may require several hours, and is preferably concluded with a fresh sodium hydroxide solution for an additional hour. The leached shape is then washed with water repeatedly until the pH of the water drops to less than 9. The result is a shape consisting of a polymer-bound aggregation of catalyst particles made by the Raney process. These particles are still connected by their original polymer matrix. At this point the shaped catalyst differs from the composition of (3) in that most or nearly all of the Al has been removed, leaving the Raney process metal. The leaching operation rarely leaches out all the Al. A residue generally remains, typically 5% of the original Al. Thus the catalyst consists essentially of an intimate mixture of:

(a) particles of Raney process metal (with any residual Al), about 15-50 parts by weight, preferably about 20-47 parts by weight;

(b) high molecular weight polymer, about 1-30 parts by weight, preferably about 2-20 parts by weight; and (c) homogeneous voids within the mixture, about 0.1-90 volume % of the total mixture, preferably about 40-80 volume %.

The composition has a surface area of about 20-80 $m^2/g$ and a macroporosity of about 0.1-70% of the total porosity.

Zinc or silicon based Raney process alloys can be leached in similar fashion.

Several methods of leaching are described by Freel et al., Journ. of Catalysis, vol. 14, No. 3, p. 247 (1969). We prefer leaching with NaOH solution.

This polymer-bound catalyst is active, and it stands ready to be used in any catalysis using a catalysts made by the Raney process that can be carried out below the softening point of the polymer matrix. Such use may be either stirred tank or fixed bed. The inventive point is particularly well demonstrated by fixed bed use, since, so far as we are aware, no other catalyst made by the Raney process having a shape of equal size and durability has been available prior to our invention.

Effective polymer softening points for some of the more useful polymers are given below.

| Polymer | Softening Point, °C. |
|---|---|
| Polyethylene, molecular wt. about 2 million | 100 |
| High molecular wt. polypropylene | 110 |
| Polyvinylfluoride | 200 |
| Polytetrafluoroethylene | 275 |
| Polychlorotrifluoroethylene | 200 |
| Fluorinated ethylene-propylene polymers | 250 |

We proceed now to the second alternate where the composition of (3) is calcined in Step (4-B), followed by sodium hydroxide leaching in Step (5-B).

(4-B) Calcination

The shapes of (3) are heated so as to remove polymer, followed by calcining to fuse the alloy particles to a porous metal structure. Simultaneously some of the Al metal is converted to alpha-alumina. Thus, the composition is calcined first in a furnace at about 300°-700° C., preferably in the presence of air or oxygen. The temperature is increased and calcination is completed at temperature between 850° and 1,200° C. Calcination at 900° C. for about 2 hours is optimum. It is pointless to continue heating beyond 1,200° C.

The composition may gain weight during calcining because of the conversion of some Al metal to alpha-alumina. The weight gain may be typically 5-20% and is a consequence of an essential step in the formation of our calcined catalyst. During calcination the Raney process alloy as such also undergoes a change to a a phase which is leaner in Al. In the case of Ni alloy, for example, as shown by x-ray diffraction, the following transformation occurs, at least in part:

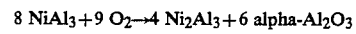

With Raney process cobalt, X-ray diffraction shows

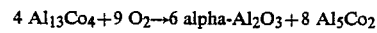

The alpha-alumina "spot-welds" or cements (sinters) the Raney process metal together.

The composition resulting from calcination has at least two unique features. In the first place, it still retains the shape (with only slight dimensional changes) that was given it in Step (2). In the second place, it consists of Raney process alloy (having particles sizes of less than 50 mesh and preferably 100 mesh) cemented together by alpha-alumina. To activate this shape, we proceed to out final step, Step (5-B), wherein we leach out aluminum metal in the known way.

(5-B) Leaching Aluminum - Calcined Catalyst

This step is identical to the leaching process in Step (4-A), and the result is likewise a highly active catalyst made by the Raney process. the composition differs from that of (4-A) in that (since there is no polymer matrix) its use is not restricted to low temperatures.

This (5-B) catalyst composition retains its original size and shape. It is extremely active, durable, and has good crush strength. These properties make it particularly valuable for use in fixed beds, where the catalyst pieces are packed in position for flow-through catalytic operations, as opposed to conventional slurry operations using Raney process catalysts, which are essentially batch processes, requiring recovery (e.g. by filtration) of the slurried catalyst particles. The catalyst of this step (our "calcined catalyst") can of course also be used in conventional slurry processes.

The catalyst resulting from this step consists essentially of Raney process metal cemented together with alpha-alumina and has several unique chemical and physical features:

(a) It retains the overall geometry and dimensions of Step (2).

(b) It can consist of an aggregate or agglomeration of catalyst particles made by the Raney process, which particles have substantially the original dimensions of the particles in Step (1).

(c) These particles are cemented together with alumina, in a form identified as alpha-alumina. This cement is believed not a complete spherical capping of the particles. Indeed, it appears to be quite spotty, just enough to fix the catalyst particles in place, so that it permits ready access of the reactants through the interstices of the particles (spaces between the particles) and into the myriad active sites on the Raney metal networks within the particle bodies.

(d) Porosimetry measurements show a high percentage of macropassages (macropores) through the interstices of the particle bodies, leading from the surface of the shape down into the particles in the interior, and we believe these macropassages help account for the astonishingly high activity of the shapes. Macroporosity is a feature not only of this (5-B) catalyst, but also of the (4-A) catalyst already described. See "Macroporosity", below.

(e) The gross composition of this (5-B) catalyst is thus $Al_2O_3$, 30–70 weight %; Raney process metal and unleached Al, balance to make 100%. The latter may include promoters.

(f) BET area is typically within the range 20–80 $m^2/g$.

(g) Pellet (shape) density (weight of catalyst divided by volume of catalyst) is typically 1–1.7 g/cc.

(h) Packed density (weight of catalyst per volume of reactor) is typically 0.6–1.3 g/cc.

At this point we may note a curious anomaly. The pellet density and the packed density of our calcined catalysts is but a fraction of that of a Raney process granule catalyst of commerce designed for use in packed systems. The pellet density of the latter is for example 3.5 and the packed density 1.72. Yet our calcined catalyst is more active. Part of the explanation lies in the fact that the BET area of our calcined catalyst is much higher than that of the commercially available packing-type granules.

In one variation in making out calcined catalyst, the step of removing the plasticizer—Step (3)—and the calcination step—(4-B)—can be combined; which is to say, the oil or other plasticizer can be left in the shaped catalyst, which is to be calcined, since the plasticizer will be vaporized from the shape during the initial stages of the heating.

Macropores

Macropores, as the term is generally understood in the catalyst art, generally refers to pores of at least 600 Angstroms and may be in the range of 1,000–10,000 Angstroms. Macropores are extremely useful in that they enhance diffisivity, which is to say, they facilitate access of reactants into the interior of the catalyst particles.

Macroporosity has been largely irrelevant in prior Raney catalysts, the reason being that particle agglomerates or granules were not large enough or durable enough for macroporosity to confer any long term benefit. Nor was there any good way known to make a granule of smaller particles, where the interstices between the particles would provide an adequate volume of internal passages contributing to significant macroporosity.

Pore size distributions are determined by mercury porosimetry on the Micromeritics Autopore 9210 (Norcross, Georgia).

In our polymer-bound catalyst (which results from Step (4-A), macropores result from the voids left by removal of the plasticizer (by extraction or vaporization, and before Al leaching). The volume of macropores is thus substantially the same as the volume contributed by the plasticizer. As noted, this may be about 0.25–0.55 cc/g, or about 35–55 volume % of the pellet.

In our calcined catalyst (the shape resulting from calcining in (4-B) followed by leaching Al in (5-B) ), the macropores comprise the voids left by both the plasticizer and the polymer, and thus are directly correlated to the sum of these materials. In this embodiment (resulting in Step (5-B) ) macroporosity runs typically 50–80% of total pore volume.

Macroporosity goes far in explaining why our catalysts are active as it increases the accessibility of reactants into the center of the pellets.

TABLE I summarizes the composition and characteristics of the six classes of compositions described above.

TABLE I

| | Compositions | | | | | | | | | | | |
|---|---|---|---|---|---|---|---|---|---|---|---|---|
| | (1) Powdered Mixture | | (2) Shaped Mixture | | (3) Plasticizer Removed | | (4-A) Al extracted from (3) | | (4-B) (3) calcined | | (5-B) Al extracted from (4-B) | |
| | Broad Range | Narrow Range | Broad Range | Narrow Range | Broad Range | Narrow Range | Broad Range | Narrow Range | Broad Range | Narrow Range | Broad Range | Narrow Range |
| Raney process alloy, p/w | 60–90 | 70–85 | 60–90 | 70–85 | 60–90 | 70–85 | 0 | 0 | 45–83 | 52–78 | 0 | 0 |

TABLE I-continued

| | Compositions | | | | | | | | | | | |
|---|---|---|---|---|---|---|---|---|---|---|---|---|
| | (1) Powdered Mixture | | (2) Shaped Mixture | | (3) Plasticizer Removed | | (4-A) Al extracted from (3) | | (4-B) (3) calcined | | (5-B) Al extracted from (4-B) | |
| | Broad Range | Narrow Range | Broad Range | Narrow Range | Broad Range | Narrow Range | Broad Range | Narrow Range | Broad Range | Narrow Range | Broad Range | Narrow Range |
| Free Raney process metal, p/w | N/A | N/A | N/A | N/A | N/A | N/A | 15-50 | 20-47 | N/A | N/A | 15-50 | 20-47 |
| Alpha-alumina, p/w | N/A | N/A | N/A | N/A | N/A | N/A | N/A | N/A | 1-42 | 11-40 | 1-42 | 11-40 |
| Polymer, p/w | 1-30 | 2-20 | 1-30 | 2-20 | 1-30 | 2-20 | 1-30 | 2-20 | 0 | 0 | 0 | 0 |
| Plasticizer, p/w | 0-40 | 10-30 | 0-40 | 10-30 | 0 | 0 | 0 | 0 | 0 | 0 | 0 | 0 |
| Voids, v/o | N/A | N/A | N/A | N/A | 0.1-70 | 35-55 | 0.1-90 | 40-80 | 0.1-70 | 35-55 | 0.1-90 | 40-80 |
| Surface Area, $m^2/g$ | N/A | N/A | N/A | N/A | N/A | N/A | 20-80 | 40-80 | N/A | N/A | 20-80 | 40-80 |
| Macroporosity, % of total porosity | N/A | N/A | N/A | N/A | N/A | N/A | 0.1-70 | 0-60 | N/A | N/A | 0.1-70 | 0.1-60 |
| Shape density, g/cc | N/A | N/A | N/A | N/A | N/A | N/A | 0.8-2 | 0.85-1.4 | N/A | N/A | 1-1.7 | 1.2-1.5 |
| Packed shape density, g/cc | N/A | N/A | N/A | N/A | N/A | N//A | 0.5-1.4 | 0.54-0.9 | N/A | N/A | 0.6-1.3 | 0.7-1 |

Explanation of TABLE:
Numbers (1), (2) . . . refer to outline in Summary of the Invention, above.
"Broad Range" means that our research indicates that values within this range are probably operable.
"Narrow Range" means preferred values, or typical values indicated by examples.
"p/w" = parts by weight.
"v/o" = volume %.
N/A = not applicable or not available.
"Free Raney Metal", (4-A) and (5-B), includes any residual Al.

It was not to be expected from the literature that, when plasticizer was removed from the shape in Step (3), this would give adequate access to the following NaOH solution, especially since the polymer remained.

The research that led to our catalysts also took into consideration a number of other adverse factors. For example, carbon is one of the well known poisons for hydrogenation catalysts. See G. F. Froment and K. B. Bischoff, Chemical Reactor Analysis and Design, p. 271, J. Wiley & Sons (1979). Hence, massive exposure of polymers and plasticizers as in our process might well be expected to seriously weaken or even destroy the catalyst. As our work shows, the reverse is true. Further, calcination would be expected to oxidize nickel or other Raney process metal, or convert it to the laminate, thereby inactivating it. But such is not the case. Calcination does indeed appear to affect the Raney process metal, as above explained, but not in any detrimental way.

We knew that Al was readily extracted from conventional Raney process nickel alloy, which we knew to contain mostly $NiAl_3$. However, we also knew that calcination was giving us a phase change, to $Ni_2Al_3$, and whether the latter was Al-extractible was completely unpredictable. (It turned out to be readily extractible.)

Further, binding the Raney process alloys with polymer and plasticizer might well have prevented activation of the particles. Removal of the plasticizer offered no certainty that the caustic solution could penetrate to the particles and leach out the aluminum.

Again, the calcined catalyst version could hardly be expected to be strengthened by calcination (which is indeed the case) by reason of the "spots" of alumina that cement the particles of alloy together. This pessimism was founded on the known chemical fact that the next step, leaching with strong NaOH solution, would be expected to dissolve out the alumina and so crumble the entire shape. But, as we have shown, this does not happen. The reason the alumina "cement" did not vanish in the NaOH leaching step was due to an unanticipated bit of chemical good fortune. This alumina turned out to be alpha-alumina, a dense form that is relatively inert to NaOH solutions. Ordinary alumina is converted to alpha-alumina only at 1,300° C. or higher, whereas we formed it at 850°-900° C. The explanation appears to be that some of the Al in the Raney process alloy was being oxidized at out "low" temperatures directly to alpha-alumina.

In sum: against the background of the relevant literature and the general catalyst art, it would appear that each and every process step in making our catalysts should have been futile at best or destructive at worst.

Catalyst Use

Our two catalysts, the polymer-bound catalyst of (4-A) and the calcined catalyst of (5-B), can be used in conventional catalysis using catalysts made by the Raney process. As noted, use of the polymer-bound catalyst is limited to processes that work at temperatures below the softening point of the polymer matrix; however, these operations can proceed in either a fixed bed or in conventional slurry operations using catalysts made by the Raney process. The calcined catalyst can do all that the polymer-bound catalyst can do, and in addition is not limited by polymer matrix considerations.

Catalysis using catalysts made by the Raney process is protean, ranging from hydrogenation (the original use) to dehydrogenation, amination, dehalogenation, by hydrogenation desulfurization by hydrogination, and others; e.g., hydrogenation of aromatic compounds to alicyclic compounds; hydrogenation of alkenes or alkynes to alkanes; hydrogenation of nitroalkanes to amines; hydrogenation of aldehydes or ketones to alkanols; hydrogenation of nitriles to amines; dehydrogenation of alkanes; synthesis of ammonia by hydrogenation of nitrogen; synthesis of hydrocarbons by hydrogenation of carbon monoxide; synthesis of methanol from carbon monoxide and hydrogen; and stem reforming. Specifically, catalysts made by the Raney process have been used to hydrogenate dinitrotoluene to toluene diamine; nitroalkanes to alkanolamines; aldehydes to the corresponding alkanol, e.g., to sorbitol, butanol, etc.; nitriles to fatty amines, e.g., to hexamethylene diamine (for making nylon); and so on. New possibilities are reported periodically. Our new catalysts are useful in all the aforesaid reactions, and others.

The term "catalysis using catalysts made by the Raney process" is thus well-known in the art, and an important aspect of this invention is the use of our new catalysts as improvements in catalysis using catalysts made by the Raney process.

Our novel catalysts can be promoted as with conventional catalysts made by the Raney process. For example, they can be promoted with Mo or Cr for synthesis of sorbitol; with Mo for benzyl alcohol; with Cr for hexamethylenediamine, etc. (see Example 11).

Stress Resistance

Our polymer-bound catalyst is fairly resilient; it will not crumble under normal stress. The ⅛-inch pellets of type (5-B) above (our calcined catalyst) have a side crush strength of 7 lbs., and crush strength is even higher for catalysts calcined at temperatures in the higher furnace range, e.g., 1,200° C. Crush strength was determined with Instron Tester Model BM.

Attrition Resistance

Catalysis in a packed column tends to erode the catalyst pellets by attrition. In this respect our catalysts show less attrition than standard 6×8 (i.e., −6+8 mesh) Raney process granules designed for use in a packed column. See Example 12.

The following examples illustrate without limiting the invention.

EXAMPLE 1

Mixing, Shaping, and Plasticizer Removal

A one hundred gram sample of −200 mesh Raney process nickel alloy containing 42 wt. % Ni and 58 wt. % Al was mixed with 6 grams of polyethylene (molecular weight about 2 million) and 30 grams of mineral oil in a Haake rheometer, operated at 150° C. and 50 rpm. The mixture was extruded into the shape of ⅛-inch, 6-ribbed hollow cylinders and cut to an aspect ratio of unity (i.e., ⅛ inch long). The pellets were dried in a vacuum oven at 60° C. to remove the mineral oil.

EXAMPLE 2

Leaching Al

A solution containing 7.4 grams of NaOH in 30 ml of water was heated to 80° C. To this solution was added 6 grams of the pellets made in Example 1 (oil removed). The temperature of the solution increased as aluminum was leached out of the alloy, due to the reaction heat. Cold water was added periodically to maintain the temperature at 90° C. The leaching process was continued for 3 hours and was repeated with a fresh NaOH solution for an additional hour. The leached pellets were washed with water repeatedly until the pH of the water had decreased to less than 9. The pellet after this treatment had a BET area of 27 m²/g.

EXAMPLE 3 (Comparative)

A −6+8- mesh Raney process nickel granule with a composition of 42 wt. % Ni and 58 wt. % Al was activated as shown in Example 2.

EXAMPLE 4

Hydrogenation of Heptene

The catalysts of Examples 2 and 3 were tested in the hydrogenation of heptene. The conditions of the test and the results are shown in TABLE II. As can be seen, the catalyst of this invention (polymer-bound catalyst) clearly out-performed the granular catalyst.

EXAMPLE 5

Hydrogenation of Toluene

The catalyst of Example 2 was tested in toluene hydrogenation (to methyl cyclohexane). At 7.5 psig $H_2$ pressure, 70° C. and a GHSV of 8.650/hr, the conversion of toluene was 36%.

The following examples, 6–10, illustrate the embodiment wherein the polymer is burnt off and the Al is partly oxidized before the pellet is activated by leaching with NaOH solution.

EXAMPLE 6

Calcined Catalyst(s)

One hundred grams of a −200 mesh Raney process nickel alloy composed of 58 wt. % Al and 42 wt. % Ni were mixed with two grams of high molecular weight polyethylene and thirty grams of mineral oil in a Haake Rheometer operated at 150° C. The mixed dough was hot-pressed into a sheet of ⅛" in thickness, cut into strips and extruded into roughly equal amounts of 1/16" rods, ⅛" rods, and ⅛" 6-ribbed hollow cylinders. The mineral oil was extracted with hexane, and the extrudates were dried in a vacuum oven at 60° C. The extrudates were then calcined in air at 900° C. for 2 hours. The weight gains during calcination for the 1/16" rod, ⅛" rod, and hollow vaned cylinder were 11.62%, 10.72%, and 11.85% respectively. The weight gain was due to the oxidation of some of the aluminum in the alloy to alpha-alumina. Weight gain exceeded weight loss due to burn-off of polymer and minor amounts of residual oil.

A comparison of the x-ray diffraction patterns of the fresh alloy and the calcined powder shows an increase in the intensities of the alpha-alumina and the $Ni_2Al_3$ peaks and a decrease in the intensities of the $NiAl_3$ peaks in the spectra of the calcined samples as compared to the fresh samples. This indicates that the following transformation has occurred:

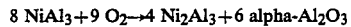

$8\ NiAl_3 + 9\ O_2 \rightarrow 4\ Ni_2Al_3 + 6\ alpha\text{-}Al_2O_3$

The 1/16" rod, ⅛" rod and the vaned hollow cylinder extrudates were activated in a 20 wt. % NaOH solution at 90° C. for 3 hours. The activated extrudates were washed with deionized water until the pH of the wash water had decreased to 8.5. The activated 1/16" rod, ⅛" rod, and vaned hollow cylinder are designated Catalysts A, B, and C respectively. The BET surface areas for these catalysts are 50, 48, and 55 m²/g respectively.

EXAMPLE 7 (Comparative)

Catalyst D is a commercially available 6×8 mesh Raney process nickel granules which have been activated from a 58 wt. % Al, 42 wt. % Ni alloy by leaching out about 25% of the Al.

EXAMPLE 8 (Comparative)

Catalyst E is a commercially available ⅛″ pellet of Ni/Kieselguhr which contains 58 wt. % Ni.

EXAMPLE 9

Hydrogenation of Toluene

The above Catalysts A, B (our invention) and D and E (comparatives) were tested in toluene hydrogenation. The results are shown in TABLE III. The catalysts of this invention (A and B) clearly out-perform the commercial catalysts. (C was not tested.)

EXAMPLE 10

Oxo-Alcohol Hydrogenation

This example demonstrates that the catalysts of this invention may be used in a trickle bed application of oxo-alcohol hydrogenation. Six cc of Catalyst A were charged into a ⅜ inch ID reactor. The reaction was carried out at 1,200 psi and 230° F. The feed was butyraldehyde at a LHSV of 1.0/hr. (LHSV = liquid hourly space velocity, i.e., liquid flow rate in cc/hr., divided by volume of catalyst in cc.) The $H_2$/butyraldehyde molar ratio was 33 to 1. Under these conditions the conversion of butryraldehyde to butanol was 99.2%.

EXAMPLE 11

Cr-Promoted Raney Cobalt Catalyst 100 grams of a chromium-promoted Raney cobalt alloy (60% Al, 38% Co and 2% Cr) were mixed with 2 grams of high molecular weight polyethylene and 25 grams of mineral oil and extruded into ⅛-inch pellets. The pellets were extracted with hexane, dried, and calcined according to the procedure of Example 6. As shown by the x-ray diffraction patterns of the calcined and uncalcined alloy, during the calcination process some of the aluminum from the original alloy was oxidized to alpha-alumina, and a new phase $Al_5Co_2$ emerged. The calcined catalyst was activated to a 20 wt. % NaOH solution and showed a high activity in toluene hydrogenation.

TABLE II

Heptene Hydrogenation on Raney Process Nickel Catalysts

| Conditions | |
|---|---|
| Feed | 10% heptene in hexane at 1 cc/min |
| $H_2$ flow rate | 200 cc/min: |
| Catalyst charge | 2.6 grams |
| Pressure | 7.5 psig |

| | Temperature, °C. | % Conversion |
|---|---|---|
| Catalyst of Example 2 | 42.2 | 58.9 |
| (this invention) | 44.5 | 71.2 |
| | 47.8 | 89.5 |
| | 49.9 | 95.8 |
| Catalyst of Example 3 | 48.5 | 11.5 |
| (Control) | 56.9 | 26.2 |
| | 68.1 | 91.6 |
| | 73.9 | 100.0 |

TABLE III

Toluene Hydrogenation on Raney Process Ni

| Conditions | |
|---|---|
| Feed | 10% toluene in hexane at 1 cc/min |
| $H_2$ flow rate | 200 cc/min |
| Catalyst charge | 2.5 to 5 grams |

TABLE III-continued

| Pressure | 7.5 psig | | | |
|---|---|---|---|---|
| Temperature, | Rate of Toluene Hydrogenation/$10^{-5}$ mol/g/min | | | |
| °C. | Catalyst A | Catalyst B | Catalyst D | Catalyst E |
| 73 | 10.4 | 10.0 | (1) | 2.35 |
| 100 | 20.5 | 18.3 | 6.0 | 5.61 |
| 124 | 30.0 | 26.1 | 14.5 | 9.47 |

(1) Not available

EXAMPLE 12

Attrition Tests

Ten grams each of Catalyst B above (our invention) and Catalyst D (commercially available Raney process nickel granules) were placed in a 250 ml flask and covered with 200 cc of water. The flasks were shaken at 320 revolutions a minute for 30 minutes on a gyratory water bath shaker (Model G75, New Brunswick Scientific Co. Inc., Edison, N.J.). The percentages of fines (−20 mesh) were 0.34% and 2.6% for Catalysts B and D respectively, demonstrating that the invention catalyst is significantly more attrition resistant than the conventional Raney process granules.

EXAMPLE 13

A one hundred gram sample of chromium promoted Raney process iron alloy containing 2% Cr, 38% Fe and 60% Al was mixed in a Haake Rheometer with 20 g of Sunthene 255 oil and 2 g of GUR 412 polyethylene and shaped into ⅛ inch extrudates. The extrudates were extracted with hexane, dried and calcined for 2 hours at 1000° C. The calcined Raney process iron extrudates were activated at 55° C. in a 20% NaOH solution for 2 hours, and further calcined in air at 500° C. for 2 hours. The resulting catalyst had a BET surface area of 16 $m^2/g$.

This catalyst was tested for its activity in ethylbenzene dehydrogenation to styrene. At a ethylbenzene LHSV of 0.33 $h^{-1}$, a water to ethylbenzene molar ratio of 14 and a temperature of 620° C., the conversion of ethylbenzene to styrene was 21.5%.

All of the above examples involve our preferred embodiment, starting with a mixture that includes Raney process alloy, polymer, and plasticizer. However, as we have stated, a 2-component mixture (Raney process alloy and polymer) is operable, per the following example.

EXAMPLE 14

Teflon-Bonded Raney Nickel Catalyst 27 g of Raney alloy (Ni/Al) particles (less than 38 micron) (−400 mesh) were mixed with 17 g of Teflon 30 dispersion (E. I. DuPont & Co.). This mixture was sprayed onto a 200 mesh stainless steel screen using an air brush. The coated screen was allowed to dry at room temperature, then was washed with acetone and placed into an oven at 380° C. for 10 minutes. The screen, when placed into 33 wt. % KOH solution, gave off gas. The aluminum was leached out in this step, giving an active Raney process nickel catalyst. When gassing stopped, the sample was washed with deionized water. The coated screen was flexible and pyrophoric.

Also, our work indicates that a simple mixture of 200 g Raney process alloy, 42 wt. % Ni, 58% Al; and 60 g polypropylene, melt flow index of 12 to 15, (a) mixed, shaped, and caustic extracted; or (b) mixed, shaped, calcined, and caustic extracted, will provide an effective Raney process catalyst useful in conventional Raney catalytic processes using catalysts made by the Raney process.

A Cautionary Note

After activation the catalysts made by the Raney process of this invention (like conventional catalysts made by the Raney process) are pyrophoric and are preferably stored with exclusion of oxygen (e.g., under water) after activation and prior to use.

It is understood that the foregoing detailed description is given merely by way of illustration and that many variations may be made therein without departing from the spirit of this invention.

What is claimed is:

1. In a catalytic process for using a catalyst made by the Raney process, the improvement comprising using as the catalyst made by the Raney process a catalyst selected from the group consisting of:
   I. shaped catalyst made by the Raney process compositions comprising an intimate mixture of:
      (a) particles of Raney process metal, present in an amount of about 15–50 parts by weight;
      (b) high molecular weight polymer, present in an amount of about 1–30 parts by weight; and
      (c) homogeneous voids within the mixture, present in an amount of about 0.1–90 volume % of the total mixture;
      said composition having a BET surface area of about 20–80 $m^2/g$, a macroporosity of about 0.1–70% of total porosity, a shaped density of about 0.8–2.0 g/cc, and a packed shape density of about 0.5–1.4 g/cc; and
   II. shaped catalyst made by the Raney process composition comprising:
      Raney process metal, cemented together with alpha-alumina, said shaped catalyst composition comprising 15–50 parts by weight of Raney process metal, 1–42 parts by weight of alumina, 0.1–90 volume % voids, having a density of about 1–1.7 g/cc, a packed density of about 0.6–1.3 g/cc, a BET surface area of about 20–80 $m^2/g$, and a macroporosity from about 0.1–70% of the total porosity.

2. Process according to claim 1, wherein the Raney process metal is Ni or Co.

3. Process according to claim 1, wherein the catalytic process is a fixed bed catalysis and the shaped catalyst made by the Raney process is in the form of an extrudate having a diameter of about 1/32 to ¼ inch and a length of about 0.5 to 6 diameters.

4. Process according to claim 3 wherein the Raney process metal is Ni or Co.

5. Process according to claim 1, wherein the catalytic process is selected from the group consisting of hydrogenation of aromatic compounds to alicyclic compounds; hydrogenation of alkenes or alkynes to alkanes; hydrogenation of nitroalkanes to amines; hydrogenation of aldehydes or ketones to alkanols; hydrogenation of nitriles to amines; dehalogenation by hydrogenation; desulfurization by hydrogenation; dehydrogenation of alkanes; synthesis of ammonia by hydrogenation of nitrogen; synthesis of hydrocarbons by hydrogenation of carbon monoxide; synthesis of methanol by hydrogenation of carbon monoxide; and steam reforming.

6. Process according to claim 5, wherein the catalyst is group I and the catalysis is the hydrogenation of heptene to heptane.

7. Process according to claim 5, wherein the catalysis is the hydrogenation of toluene to methylcyclohexane.

8. Process according to claim 5, wherein the catalyst is group II and the catalysis is the hydrogenation of butyraldehyde to butanol.

* * * * *